July 22, 1969 J. D. WATSON 3,457,433

OFF-DELAY APPARATUS

Filed March 24, 1967

United States Patent Office 3,457,433
Patented July 22, 1969

3,457,433

OFF-DELAY APPARATUS

John D. Watson, Pittsburgh, Pa., assignor to Westinghouse Electric Corporation, Pittsburgh, Pa., a corporation of Pennsylvania Filed Mar. 24, 1967, Ser. No. 625,762
Int. Cl. H01h *43/02*
U.S. Cl. 307—141 12 Claims

ABSTRACT OF THE DISCLOSURE

An OFF-delay relay is shown as including a trigger formed by a compound pair of unlike conductivity type transistors with their collectors and bases cross coupled. The trigger is turned ON and OFF in response to different charge levels of a capacitor whose charge level is dependent on the presence or absence of a control signal. An output switch is closed or open depending on which of the ON and OFF states the trigger is in. Normally, that is before the receipt of a control signal, the capacitor charge is at a low first level near zero, the trigger is ON, and the output switch is open. In response to the receipt of a control signal, the capacitor charges to a second level that is higher than the level required to turn off the trigger. In response to turn-OFF of the trigger, the output switch is closed. When the control signal is removed, the capacitor discharges via a high impedance first discharge path from the second level toward the first level at a first rate until the charge level at which the trigger is turned ON is reached. In response to turn-ON of the trigger, the output switch is opened. Also in response to turn-ON of the trigger, the capacitor abruptly discharges to the first level through a lower impedance discharge path including the output transistor of the compound pair.

Background of the invention

This invention relates to OFF-delay apparatus that is, apparatus which in response to the receipt of a control signal changes from OFF mode to ON mode, and upon removal or cessation of the control signal reverts to the OFF mode. The output of the apparatus is in one or the other of two states depending on whether the apparatus is in the ON or OFF modes. The invention is especially practical and useful when incorporated in an OFF-delay relay.

An OFF-delay device has three states-ON-TIMING-OFF. In the usual arrangement of an RC timing circuit with a following trigger which breaks down when the capacitor charge reaches the trigger threshold, the capacitor, starting from an initial state, charges until the threshold of the trigger is reached, whereupon the trigger breaks down and the capacitor is abruptly returned to its initial state. Thus such a device has only two states, initial and timing, and without additional circuitry such as an added bistable to provide a third state, cannot be employed as an OFF-delay device.

In prior proposed arrangements of a cross-coupled compound pair of complementary (unlike conductivity) transistors triggered from an RC timing circuit, the RC timing circuit is connected to drive the emitter of the input transistor of the compound pair. In these prior proposals, the timing resistor also must supply the latching current of the trigger. This conflicts with the requirement that the timing resistor be large to obtain long time delays without a large capacitor. The transistors in such prior art circuits are difficult to turn-OF when it is desired to repeat the timing cycle. Also any leakage through these transistors will tend to discharge the timing capacitor, and thereby decelerate the timing action, and could prevent the timer from operating.

Summary of the invention

One aspect of the present invention provides the three-state function by so arranging an RC circuit and trigger, that when the capacitor charge reaches the trigger threshold it is abruptly charged fully in the same direction as it was previously charging (during the timing cycle), instead of being returned to its initial state. It should be noted that the term "charging" is applicable to change the capacitor charge in either direction so that "discharge" also falls within the term.

Another aspect of the present invention involves a cross-coupled pair of complementary transistors triggered from an RC timing circuit in an arrangement wherein the timing circuit drives the base of the input transistor instead of its emitter. In this arrangement the timing resistor does not supply the latching current and therefore can be made large if necessary. Also the trigger transistors are easily turned OFF to repeat the timing cycle and any tendency to discharge the capacitor by a leakage through the transistors in their OFF state will accelerate the timing action, thus making the circuit inherently a "fail safe."

Another advantage of this arrangement is in connection with an output SCR switch in an AC load circuit. In this connection, firing of the SCR switch is assured during each half cycle of the AC.

Accordingly it is an object of the present invention to provide a new and improved OFF-delay apparatus.

Another object is to provide a new and improved combination of RC and trigger providing the three-state function.

Another object of the present invention is to provide a new arrangement of a compound pair of cross-coupled complementary transistors triggered by an RC circuit.

A further object of the invention is to provide OFF-delay apparatus wherein a cross-coupled complementary pair of transistors is triggered by an RC circuit whose timing resistor does not supply the latch current of the trigger.

A still further object of the invention is to provide OFF-delay apparatus wherein a cross-coupled pair of complementary transistors triggered by an RC circuit is "fail safe" in that operation is insured despite capacitor discharge tendencies caused by trigger transistor leakage.

Yet another object of the invention is to provide OFF-delay apparatus wherein a new arrangement of a cross-coupled pair of complementary transistors triggered by an RC circuit provides sustained output signals to assure firing during each half cycle of a controllable valve in an AC load circuit.

Other and further objects and advantages of the present invention will become apparent from the following detailed description taken in connection with the drawings wherein a preferred embodiment of the invention is illustrated in the form of an OFF-delay relay.

Description of the preferred embodiment

Figure 1:
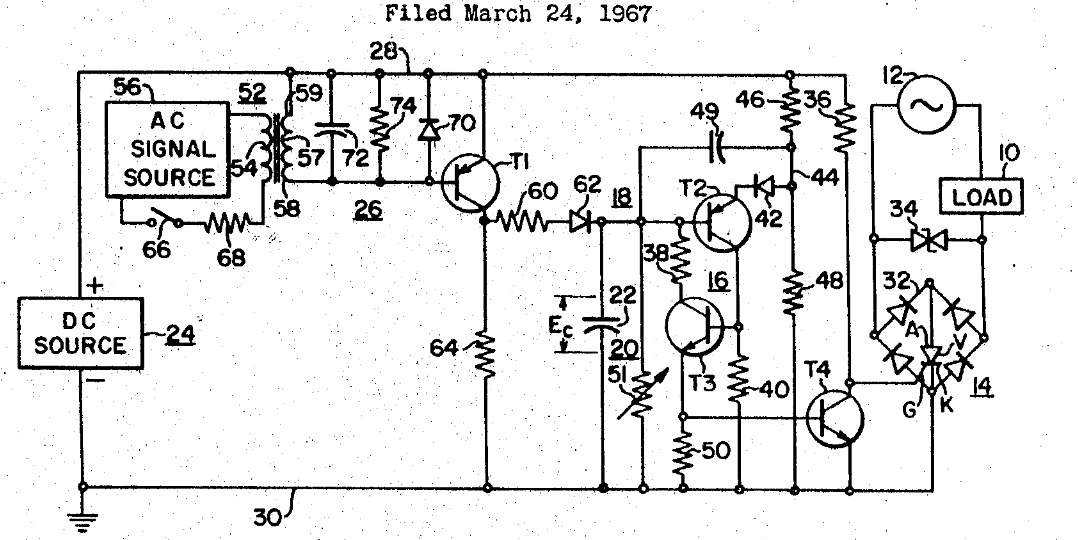
FIGURE 1 is a schematic diagram of an AC load control system incorporating an OFF-delay relay.

As seen in FIGURE 1, AC (alternating current) power is supplied to a load 10 from an AC source 12 through a bilateral (symmetrical) switch 14 whenever the switch is in the closed mode. Whether the switch 14 is in the open mode or the closed mode depends on which of respective ON and OFF states is assumed by a trigger circuit 16. The trigger circuit is part of a timing circuit 18 which also includes an RC circuit 20 that drives the trigger 16. The arrangement is such that the ON and OFF states of the trigger 16 are assumed in response to different charge levels of a timing capacitor 22 included in the RC circuit 20.

The active elements of the timing circuit 18 are supplied with power from a suitable DC source 24 which also supplies charging current to the capacitor 22 through a gate circuit 26 in response to control signals. The output of DC source 24 is connected to positive and negative busses 28 and 30 respectively.

The symmetrical switch 14 is shown by way of example as a full wave rectifier bridge 32 with its AC input terminals connected in series between the AC source 12 and load 10, and its DC output terminals connectable through the internal main current path of a controllable electric valve V operating in the switching mode. Valve V is provided with a control electrode G, and main electrodes A and K, the latter two electrodes being connected to the DC terminals of bridge 32. Valve V may for example be a controlled rectifier of tube type, semiconductor type, or other. Thyratrons are well known tube type controlled rectifiers, while thyristors are well known semiconductor controlled rectifiers. Valve V is shown by way of example as a thyristor with A being the anode, G being the gate, and K being the cathode. A bilateral breakover device 34 is connected across the AC input terminals of bridge 32 in order to prevent two-terminal or anode breakover operation of thyristor V.

The gate-cathode junction of valve V is connected across the main electrodes of a transistor T4, so that valve V operates as a closed or as an open switch depending on the output state of transistor T4. By way of example transistor T4 is shown as an NPN type with its collector connected to gate G of valve V, and through a resistor 36 to the positive bus 28. The emitter of transistor T4 is connected to the negative bus 30 and to the cathode K of valve V. The base of transistor T4 is driven by the output of trigger 16.

Trigger 16 is shown as including a compound pair of transistors T2 and T3. These transistors are cross-coupled, that is, the collector of each is connected to the base of the other. Transistors T2 and T3 are of opposite conductivity type, that is, one is an NPN type while the other is a PNP type. In the examples shown transistor T2 is a PNP while transistor T3 is an NPN. Transistor T2 is the input transistor of the trigger 16, while transistor T3 is the output transistor.

The base of transistor T2 is connected to the upper end of capacitor 22, and through a resistor 38 to the collector of transistor T3. The collector of transistor T2 is connected to the base of transistor T3, and through a resistor 40 to the negative bus 30. The emitter of transistor T2 is connected through an asymmetric current conducting device such as a diode 42 to a junction 44 between two resistors 46 and 48 whose other ends are connected to the busses 28 and 30 respectively. A noise suppressing capacitor 49 is connected between the junction 44 and the base of transistor T2.

The emitter of transistor T3 is connected to the base of transistor T4, and through a resistor 50 to the negative bus 30.

Resistors 46 and 48 operate as a voltage divider and hold the anode of diode 42 at a predetermined voltage, thereby determining the triggering threshold voltage of the trigger 16. When the input voltage to the base of transistor T2 falls low enough, the base-emitter junction of transistor T2 and the diode 42 are forward biased, thus turning transistor T2 ON. Current from the collector of transistor T2 flows into the base of transistor T3, thus turning the latter transistor ON. The collector of transistor T3 draws current from the input source (capacitor 22) and from the base of transistor T2, thereby turning transistor T2 on harder, so that once action is initiated, transistors T2 and T3 rapidly turn ON into saturation. It may be noted at this time that turn-ON of transistor T3 abruptly discharges capacitor 22 through a relatively low resistance path including transistor T3, resistor 38 and the base-emitter junction of transistor T4. Turn-ON of trigger 16 turns ON transistor T4 thereby grounding gate G of the valve V to turn the switch 14 OFF. If the input voltage to the trigger 16 rises above a predetermined value that is higher than the trigger threshold value, the trigger turns OFF, thereby turning transistor T4 OFF and firing thyristor V, thus closing the switch 14 to apply power to the load 10 from the source 12. Normally, that is without charging voltage being applied to capacitor 22, the capacitor voltage sets at or near ground well below the threshold value of trigger 16. Thus trigger 16 is normally turned ON, and switch 14 is normally in open circuit mode.

In addition to capacitor 22, the RC circuit 20 includes a high resistance discharge path 51 connected across capacitor 22. The discharge path 51 has an appreciably higher resistance than the discharge path formed by transistor T3, resistor 38 and the base-emitter junction of transistor T4.

Gating circuit 26 includes a transistor T1 controlled by the output of a signal isolating transformer 52 in response to control signals supplied to the input winding 54 of the transformer from an AC signal source 56. Transformer 52 is provided with a secondary winding 57 whose lower end 58 is connected to the base of transistor T1. This transistor is shown as a PNP type with its emitter connected to the DC bus 28 and the upper end 59 of the output winding 57. The collector of transistor T1 is connected through a resistor 60 and an asymmetric current conduction device 62 to the upper end of capacitor 22. Also the collector of transistor T1 is connected through a resistor 64 to the negative bus 30. Asymmetric device 62 may for example be a semiconductor diode.

The AC signal source 58 is connected through a switch 66 (when closed) to the input winding 54. A resistor 68 in series with the input winding 54 converts control input AC to a current source for driving the base of transistor T1. When AC is applied to the input winding 54, the half cycles of the transformer output during which the lower end 58 of output winding 57 is negative, shall be referred to as the negative half-cycles, while the opposite or intermediate half-cycles shall be referred to as the positive half-cycles of the transformer output. Transistor T1 being a PNP type, will be turned on by each negative half cycle of the transformer 52 output. Input signal current during the positive half-cycles is bypassed through an asymmetric current conduction device 70 (for example a semiconductor diode), suitably poled, connected across the "input" circuit of transistor T1. Noise in the input to the base of transistor T1 is suppressed by a noise suppression network including a capacitor 72 and a resistor 74 connected across the input circuit of transistor T1.

The "normal" condition of OFF-delay apparatus is the quiescent condition, that is when it is settled in the OFF state in the absence of a control signal at its input. This corresponds to the "dropped-out" condition in the case of an OFF-delay electromagnetic relay. The switch output of a relay may be "normally opened" or "normally closed" depending on the desired design. Paraphrased, this says that when the relay is OFF, its switch output may be opened or closed, depending on design. When the relay changes from OFF to ON, the switch output changes states, from open to closed or closed to open as the case may be.

Figure 2:
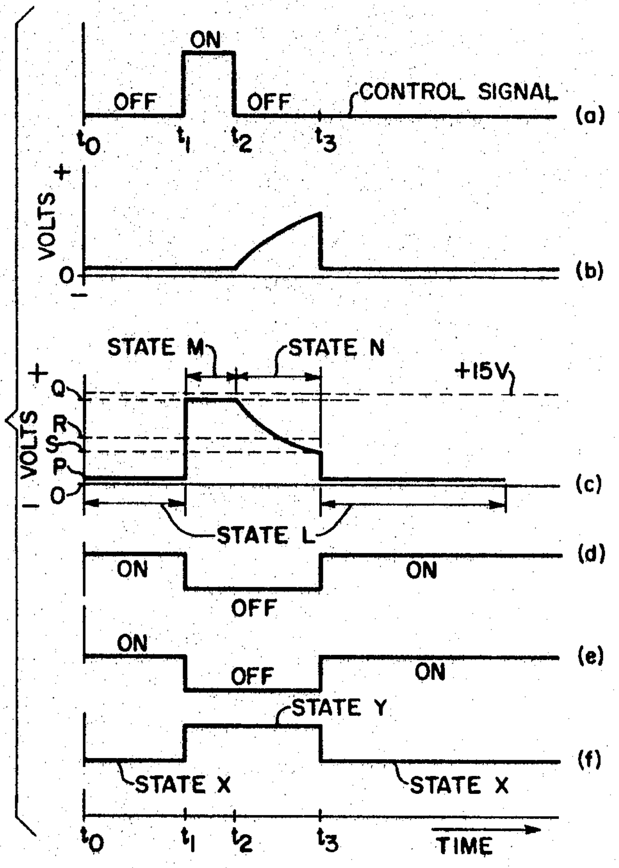
FIG. 2 is a chart showing waveforms illustrating operation of the circuit of FIGURE 1 as compared to operation of conventional RC timing circuits.

The two-state characteristic of a conventional timing circuit, in which a trigger circuit is driven by an RC circuit, is illustrated at (*b*) in FIG. 2. The waveform at (*b*) is the capacitor voltage of the timing capacitor in response to the control signal whose ON and OFF times are shown at (*a*) in FIG. 2. As hereinbefore stated, a two-state circuit must be combined with another two-state circuit in order to provide the three-state function required in an OFF-delay device.

In contrast the three-state characteristic of the timing circuit 18 is illustrated by the waveform at (*c*) in FIGURE 2. The waveform at (*c*) is that of the voltage $E_c$ across the capacitor 22 as it responds to the control signal shown at (*a*) in FIGURE 2. Additional curves (*d*), (*e*) and (*f*) in FIGURE 2 are useful in understanding the operation of the apparatus of FIGURE 1. Curve (*d*) shows the modes of trigger 16 as it responds to the voltage $E_c$ across capacitor 22. Curve (*e*) illustrates turn-ON and turn-OFF of transistor T4 in response to the modes of trigger 16. Curve (*f*) shows the states assumed by the switch 14 in response to transistor T4. In the illustrated example, state X is the open circuit mode of the switch 14, while state Y is the closed circuit mode. All the curves in FIG. 2 are on the same time base.

In considering the operation of the apparatus in FIGURE 1, assume first that switch 66 is open thus blocking a control signal from the control input circuit of the apparatus. In the absence of a control signal at its input, the apparatus is in the "normal" state or mode. In this mode the voltage $E_c$ across capacitor 22 is at level P (P is at or near ground (FIG. 2(*c*)), trigger 16 is ON, transistor T4 is ON, valve V is OFF, and switch 14 is open thereby blocking the flow of power from the AC source 12 to the load 10. The apparatus output is in state X. The absence of the control signal is illustrated by the initial OFF portion (between times *t0* and *t1*) of the control signal curve at (*a*) in FIGURE 2. (Note that the waveform in (*a*) indicates only the OFF and ON periods of the control input signal; it does not illustrate magnitude or polarity.)

Assume now that switch 66 is closed at time *t1*. In response to closure of switch 66 an input control signal is applied to the base of transistor T1, thereby turning this transistor ON to admit charging current into capacitor 22 which immediately charges to a level Q (FIG. 2(*c*)), thus turning OFF the trigger 16 since the voltage Q is above the turn-OFF threshold voltage R of transistor T2 and thus of the trigger 16. Although the turn-OFF voltage threshold R of the trigger is above its turn-ON threshold value S (FIG. 2(*c*)), there is so little hysteresis that the turn-ON and turn-OFF thresholds of trigger 16 may as practical matter be considered the same value. As a result, transistor T3 is turned OFF thereby turning transistor T4 OFF to cause turn-ON of valve V thus closing switch 14 (state Y) and applying power to the load 10. In the curve (*f*) of FIGURE 2, the closed mode of switch 14 is indicated as state Y.

Now suppose that switch 66 is opened at time *t2*, thereby removing the control signal from transistor T1 to turn this transistor OFF thus opening the charging path to capacitor 22. Capacitor 22 begins to discharge through the discharge path 51 in accordance with the time constant of the RC circuit 20 as illustrated between time *t2* and time *t3* on the waveform at (*c*) in FIGURE 2. At time *t3* the capacitor voltage reaches the turn-ON threshold level S of transistor T2. When the capacitor charge reaches the level S, trigger 16 is turned ON thereby turning ON transistor T4 and also abruptly discharging capacitor 22 to its initial level P via the discharge path including resistor 38, transistor T3 and the base-emitter junction of transistor T4. In response to turn-ON of transistor T4, the valve V is turned-OFF, thereby opening switch 14 and cutting off the load current. The apparatus output has reverted to state X. The OFF-delay period extending from *t2* to *t3* may be adjusted by adjusting the time constant of the RC circuit 20 for example by adjusting the resistor 51.

In the illustrated example the output state X corresponds to the open circuit mode of switch 14, while state Y corresponds to the closed circuit mode of the switch. Thus switch 14 is "normally open," and the switch closes in response to receipt of a control signal by transistor T1. Switch 14 may be made "normally closed" by interposing a signal inverter such as another NPN transistor between transistor T4 and the gate of thyristor V, so that switch 14 will be operated to the open circuit mode in response to the receipt of an input signal by transistor T1. In that case, output state X is the "normally closed" mode of switch 14.

It should be noted that operation analogous to that of the apparatus in FIG. 1 may be had by reversing the conductivity types of the transistors and the polarities of the DC supply busses 28 and 30. In such case, at time *t1* the capacitor 22 charges negatively from ground and at time *t2* begins to discharge positively toward ground. At time *t3* the capacitor is abruptly discharged to ground. In this arrangement with reversed conductivity type transistors, the gate-cathode circuit of thyristor V would be connected across an added resistor connected between resistor 36 and the DC bus 28 (non negative), with the cathode of the thyristor connected to the bus 28. This arrangement makes switch 14 "normally closed."

The function of some of the individual components are as follows. Resistor 64 pulls collector of transistor T1 to near ground when that transistor turns OFF, thus reverse biasing diode 62 and preventing any leakage of transistor T1 from affecting timing capacitor 22. Resistor 60 limits charging current thus preventing damage to capacitor 22 and also preventing overload of the charging supply source 24. Resistor 50 prevents emitter leakage of transistor T3 from prematurely turning ON transistor T4. Resistor 51 determines time constant with which capacitor 22 discharges and hence determines the delay of timer 18.

Diode 42 is reverse biased while capacitor 22 is discharging, thus protecting the base-emitter junction of transistor T2 from excessive reverse voltage. Resistor 40 prevents collector leakage of transistor T2 from turning transistor T3 ON prematurely. Resistor 38 limits collector current of transistor T3 so that when it is desired to recharge capacitor 22 through transistor T1, not all of transistor T1 collector current will flow straight into transistor T3. Without resistor 38, all current from transistor T1 would flow into the collector of transistor T3, and capacitor 22 would not be charged. Resistor 36 limits current and supplies current to the gate of thyristor V when transistor T4 is OFF.

By way of example various components of the disclosed apparatus may have the followinng values and type designations.

Resistor 36—680 ohms
Resistor 38—2 kilohms
Resistor 40—240 kilohms
Resistor 46—4.5 kilohms
Resistor 48—1.9 kilohoms
Resistor 50—33 kilohms
Resistor 51—adjustable 7.5 to 15 kilohms
Resistor 60—680 ohms
Resistor 64—100 kilohms
Resistor 68—24 kilohms
Resistor 74—33 kilohms
Capacitor 22—5 microfarads
Capacitor 49—.003 microfarad
Capacitor 72—0.1 microfarad
diodes 42, 62 and 70—type 1N457
Transistor T1—type 2N3638
Transistor T2—type 2N3799
Transistor T3—type 2N1711
Transistor T4—type 2N2713
Thyristor V—type MCR2305–6
DC source 24—15 volts
AC source 56—115 v. 60~
Transformer 52—1:1 ratio Using the above component values, the threshold S of transistor T2 is about +4.5 volts, and the time constant of RC circuit 20 (discharge path 51) and therefore the delay of the timing state N between times $t2$ and $t3$, FIG. 2(*c*) is adjustable from about .02 to about 60 seconds.

It is to be understood that the herein-described arrangements are simply illustrative of the principles of the invention, and that other embodiments and applications are within the spirit and scope of the invention.

What I claim is:

1. OFF-delay apparatus having respective input and output circuits and which apparatus assumes an ON mode in response to receipt of a control signal at its input circuit and an OFF mode in delayed response to the removal of said signal, said apparatus comprising a capacitor normally at a first charge level before the receipt of a control signal by said input circuit, a normally ON trigger circuit which turns ON and OFF in response to different charge levels of the capacitor, means responsive to the receipt of a control signal by said input circuit for charging the capacitor from said first level to a second level to turn the trigger circuit OFF, said trigger circuit having a turn-ON threshold value such that the trigger circuit will turn ON in response to the capacitor charge reaching a third level while the capacitor is discharging from the second level toward the first level, said trigger circuit having a turn-OFF threshold value such that the trigger circuit will turn OFF in response to the capacitor charge exceeding a level that is greater than the third level and less than the second level, a first path connected across said capacitor for discharging the capacitor from the second level toward the first level at a first rate when such a control signal is removed from the input circuit, and a second path connected across said capacitor and responsive to turn-ON of said trigger circuit for discharging the capacitor to said first level at a faster rate than said first rate, said output circuit assuming one of two states in response to turn-ON of said trigger circuit and the other of said states in response to turn-OFF of said trigger circuit.

2. The combination as in claim 1 wherein said apparatus is an OFF-delay relay and said output circuit comprises a switch circuit, and wherein said one output state corresponds to one of respective open and closed circuit modes of the switch circuit while the other output state corresponds to the other of said open and closed circuit modes of the switch circuit.

3. The combination of claim 2 wherein said switch circuit comprises a controlled rectifier.

4. The combination as in claim 1 wherein said trigger circuit comprises means having the characteristics of a cross-coupled pair of opposite conductivity type transistors with the collector of each coupled to the base of the other, said trigger circuit having an input terminal corresponding to a connection to the base of one of said transistors, said trigger circuit having an output terminal corresponding to a connection to the emitter of the other of said transistors, and wherein said apparatus includes means connecting said capacitor to said input terminal, and means connecting said output terminal to said output circuit.

5. The combination as in claim 4 wherein said apparatus is an OFF-delay relay and said output circuit comprises a switch circuit and wherein said one output state corresponds to one of respective open and closed circuit modes of the switch circuit while the other output state corresponds to the other of said open and closed circuit modes of the switch circuit.

6. The combination of claim 5 wherein said switch circuit comprises a controlled rectifier.

7. The combination of claim 1 wherein said trigger circuit comprises a compound pair of transistors of opposite conductivity types each having a base, an emitter, a collector and an internal collector-emitter path, said capacitor being connected to drive the base of one of the transistors, the collector of said one transistor being connected to drive the base of the other transistor, the collector of said other transistor being connected to drive the base of said one transistor, and wherein said output circuit of the apparatus is driven by said other transistor whereby said one and other transistors are respectively the input and output transistors of the compound pair.

8. The combination as in claim 7 wherein said apparatus is an OFF-delay relay and said output circuit comprises a switch circuit and wherein said one output state corresponds to one of respective open and closed circuit modes of the switch circuit while the other output state corresponds to the other of said open and closed circuit modes of the switch circuit.

9. The combination of claim 8 wherein said switch circuit comprises a controlled rectifier.

10. The combination of claim 7 wherein said second path comprises the internal collector-emitter path of said other transistor.

11. The combination as in claim 10 wherein said apparatus is an OFF-delay relay and said output circuit comprises a switch circuit and wherein said one output state corresponds to one of respective open and closed circuit modes of the switch circuit while the other output state corresponds to the other of said open and closed circuit modes of the switch circuit.

12. The combination of claim 11 wherein said switch circuit comprises a controlled rectifier.

References Cited

UNITED STATES PATENTS

| | | | |
|---|---|---|---|
| 3,282,631 | 11/1966 | Mosinski | 307—293 |
| 3,315,098 | 4/1967 | Eckl | 307—293 |
| 3,365,654 | 1/1968 | Johnston | 307—252 |

ROBERT K. SCHAEFER, Primary Examiner

D. SMITH, Jr., Assistant Examiner

U.S. Cl. X.R.

307—252, 293